United States Patent
Isobe et al.

(10) Patent No.: US 7,703,111 B2
(45) Date of Patent: Apr. 20, 2010

(54) OBJECTIVE LENS DRIVING DEVICE, OPTICAL PICKUP, OPTICAL DISK DEVICE WITH VIBRATION SUPPRESSION, AND VIBRATION SUPPRESSION METHOD

(75) Inventors: Hiroshi Isobe, Shizuoka (JP); Muneyuki Horiguchi, Shizuoka (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 11/509,559

(22) Filed: Aug. 25, 2006

(65) Prior Publication Data

US 2007/0050802 A1    Mar. 1, 2007

(30) Foreign Application Priority Data

Aug. 30, 2005    (JP) .............................. 2005-250322

(51) Int. Cl.
*G11B 7/00* (2006.01)

(52) U.S. Cl. ..................................................... 720/688

(58) Field of Classification Search .................. 720/688
See application file for complete search history.

(56) References Cited

U.S. PATENT DOCUMENTS

| | | | | |
|---|---|---|---|---|
| 5,264,968 A | * | 11/1993 | Masunaga | 359/824 |
| 5,446,721 A | * | 8/1995 | Sekimoto et al. | 720/684 |
| 5,748,580 A | * | 5/1998 | Matsui | 369/44.16 |
| 2002/0071376 A1 | * | 6/2002 | Kimura et al. | 369/112.23 |
| 2002/0172109 A1 | * | 11/2002 | Fujita | 369/44.16 |
| 2007/0011694 A1 | * | 1/2007 | Uno et al. | 720/688 |

FOREIGN PATENT DOCUMENTS

| | | | | |
|---|---|---|---|---|
| JP | 10021568 A | * | 1/1998 | |
| JP | 10320804 A | * | 12/1998 | |
| JP | 11306570 A | * | 11/1999 | |

* cited by examiner

*Primary Examiner*—David D Davis
(74) *Attorney, Agent, or Firm*—Rader, Fishman & Grauer PLLC

(57) ABSTRACT

In this invention, an objective lens driving device, an optical pickup, and an optical disk device are disclosed which have a feature that plural dynamic vibration absorbers provided at the retaining section, by which the elastic supporting members supporting the movable section retaining the objective lens are connected to the movable section, can reduce a resonance peak, which may worsen the servo characteristic, and suppress unwanted vibration effectively, since the character frequency of the dynamic vibration absorbers functions as a damper against the vibration of the movable section. This invention also discloses a method of suppressing the vibration of the movable section.

9 Claims, 7 Drawing Sheets

OBJECTIVE LENS DRIVING DEVICE, OPTICAL PICKUP, OPTICAL DISK DEVICE WITH VIBRATION SUPPRESSION, AND VIBRATION SUPPRESSION METHOD

CROSS REFERENCES TO RELATED APPLICATIONS

The present invention contains subject matter related to Japanese Patent Application JP 2005-250322 filed in the Japanese Patent Office on Aug. 30, 2005, the entire content of which is incorporated herein by reference.

BACKGROUND OF THE INVENTION

This invention relates to an objective lens driving device used for an optical pickup for recording and/or reproducing data on and/or from optical disks or other data recording media and for operating a movable section to move in both the focusing and tracking directions, and it relates further to an optical pickup and an optical disk device using the aforesaid objective lens driving device.

An optical disk device is in existence for recording and/or reproducing data signals by using optical disks and other data recording media, and such an optical disk device is provided with an optical pickup which moves in the radius direction of the optical disk and irradiates an optical beam to the aforesaid optical disk.

The optical pickup is mounted with an objective lens driving device by which the objective lens retained on the movable section of the driving device is moved in the focusing direction, namely the direction of getting farther from or nearer to the signal recording face of the optical disk, for focusing adjustment, and also moved approximately in the radius direction of the optical disk for tracking adjustment. Through these movements of the objective lens, the spot of the optical beam irradiated on the optical disk through the objective lens is adjusted and thereby focused on the recording track of the disk Such an objective lens driving device of the optical pickup has a frequency characteristic as shown by the curve $G_2$ in FIG. 7, owing to the weight of the movable section and the elastic coefficient of the elastic supporting members. In the optical pickup, a resonance peak resulting from the elastic vibration of the movable section might deteriorate the characteristic of focusing servo in particular and disturb the performance of recording and/or reproducing data on or from the optical disk.

SUMMARY OF THE INVENTION

There is a need for providing an objective lens driving device, an optical pickup, and an optical disk device so as to reduce a resonance peak, which may worsen the servo characteristic, and to suppress an unwanted vibration.

In an embodiment according to the present invention, there is provided an objective lens driving device including a movable section to hold an objective lens, plural elastic supporting members to support the movable sections movably in the focusing direction and in the tracking direction in relation to the objective lens, a fixed section to fasten the distal ends of the elastic supporting members, and plural dynamic vibration absorbers disposed at the retaining sections by which the elastic supporting members are connected to the movable section.

It is desirable that an optical pickup in an embodiment according to the present invention has a movable carriage to move in the radius direction of an optical disk operated and rotated by a disk rotary drive mechanism, and the objective lens driving device is arranged on the movable carriage, the objective lens driving device to be used here being such as the one mentioned above.

Further, it is also desirable that an optical disk device in an embodiment according to the present invention has a disk rotary driver to rotate an optical disk, and an optical pickup to irradiate a light beam through an objective lens on the optical disk rotated by the disk rotary driver; the optical pickup including a movable carriage to move in the radius direction of the optical disk and the objective lens driving device being arranged on the movable carriage; and the objective lens driving device used being as one mentioned above.

The objective lens driving device, the optical pickup, and the optical disk device in an embodiment according to the present invention are expected to have such a feature that plural dynamic vibration absorbers provided at the retaining section, by which the elastic supporting members supporting the movable section retaining the objective lens are connected to the movable section, can reduce a resonance peak which may worsen the servo characteristic and suppress an unwanted vibration effectively, since the character frequency of the dynamic vibration absorbers functions as a damper against the vibration of the movable section.

BRIEF DESCRIPTION OF THE DRAWINGS

Embodiments of the present invention will be described in detail based on the following figures, wherein.

DETAILED DESCRIPTION OF THE PREFERRED EMBODIMENTS

Preferred embodiments of the optical disk device of the present invention are described below with reference to the accompanying drawings.

Figure 1:
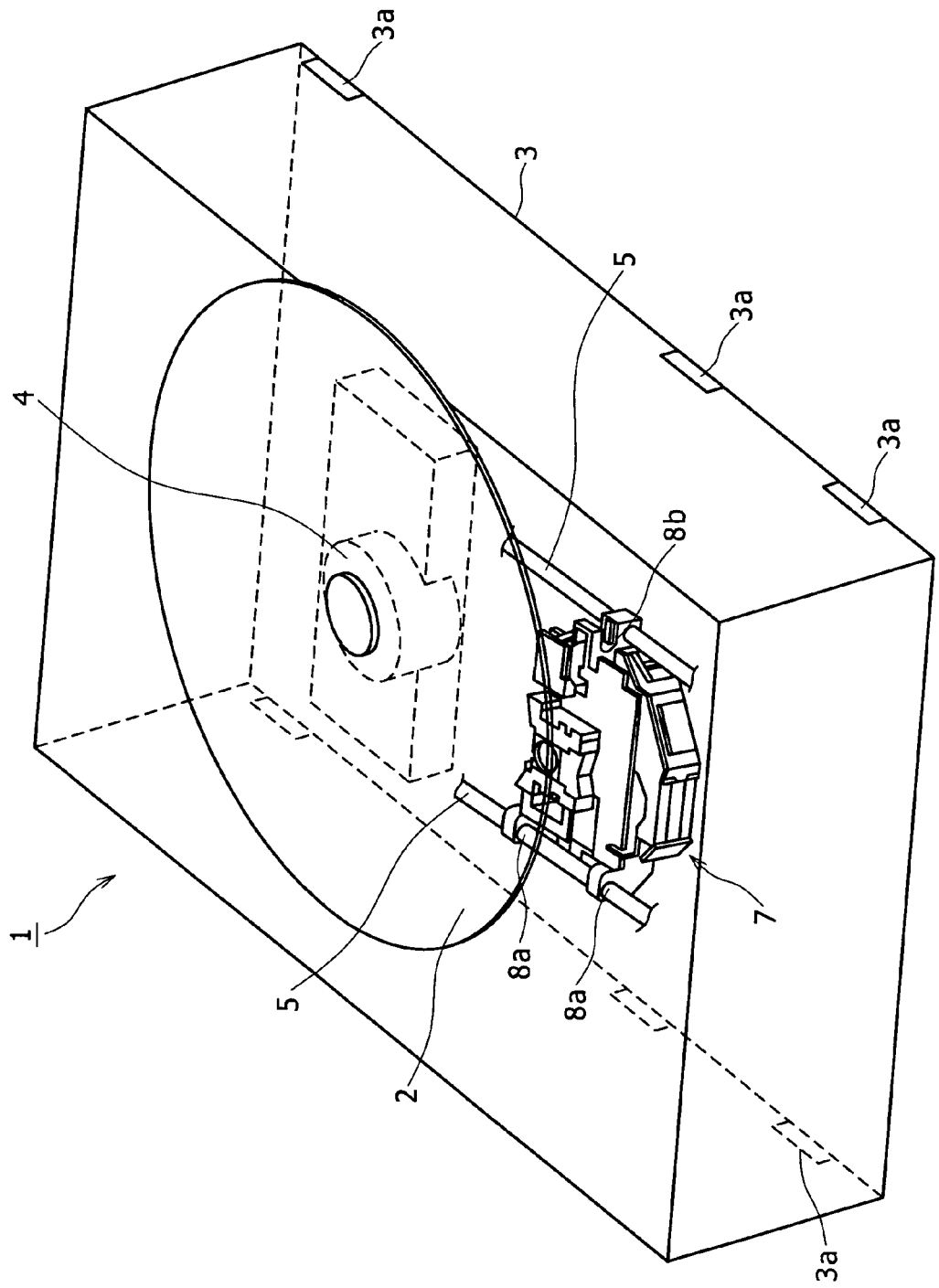
FIG. 1 is a perspective view of an optical disk device in an embodiment according to the present invention.

As shown in FIG. 1, an optical disk device 1 in an embodiment according to the present invention is used to record and/or reproduce data on or from an optical disk 2. For the optical disk 2 on or from which the optical disk device 1 makes a recording and/or a reproduction, the media actually used are such as a CD (Compact Disk) and a DVD (Digital Versatile Disk); a CD-R (Recordable) and a DVD-R (Recordable), both of which are write-once type; a CD-RW (ReWritable), a DVD-RW (ReWritable), and a DVD+RW (ReWritable), these three optical disks allowing re-writing of data; other optical disks of the high-density recording type using semiconductor lasers of a shorter emission wavelength, such as about 405 mm (bluish-purple); and, in addition, magnetic optical disks, etc.

More concretely, as shown in FIG. 1, the optical disk device 1 has a casing 3, in which there are provided a disk loading slot (not shown in the drawing); a chassis; a disk rotary drive mechanism 4 to drive and rotate the optical disk set on the chassis; and an optical pickup 7 supported on guide shafts 5 fixed in parallel on the chassis so as to be able to move in the radius direction of the optical disk. Plural vent holes 3a are provided in several lower parts on sides of the casing.

Figure 2:
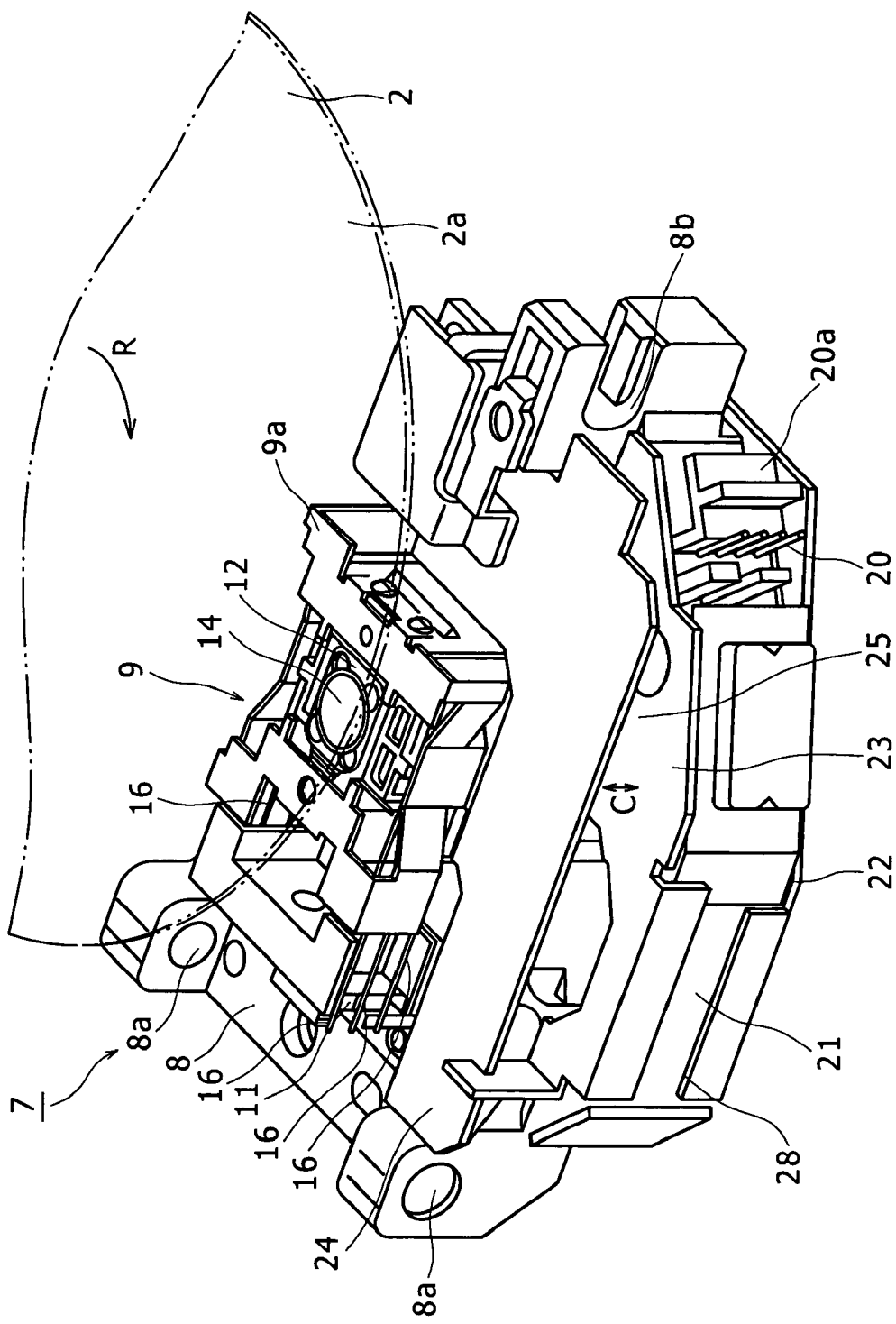
FIG. 2 is a perspective view of an optical pickup in an embodiment according to the present invention.

The optical pickup 7, as shown in FIG. 2, includes a light source 20 to project a certain wavelength of a light beam, some optical parts making up an optical system to irradiate a light beam projected from the light source 20 onto the optical disk 2 and to detect return light reflected on the optical disk 2, the movable carriage with these optical parts arranged thereon, and the objective lens driving device 9 disposed on this movable carriage 8. The light source 20 is a semiconductor laser retained on the laser holder 20a. The objective lens driving device 9 is fitted with a cover 9a.

The movable carriage 8 has bearings 8a and 8b on both the ends, and these bearings 8a and 8b are slidably supported on guide shafts 5. A rack member, not shown in the drawing but fitted on the movable carriage 8, is engaged with a lead screw, and when the lead screw is rotated by a feed motor, the rack member moves toward the direction corresponding to the rotating direction of the lead screw, thus driving the optical pickup 7 in the radius direction of the optical disk 2.

As shown in FIG. 2, the optical pickup 7 includes a pair of radiator plates 22 and 23 forming a first air flow passage 21 by being placed so as to face the plane of rotation 2a of the optical disk in a parallel relationship and with certain spaces apart from one another; an electronic circuit board facing one of the radiator plates 23 with a certain space "c" apart in-between and forming a second air flow passage 25; and an opening 28 from which air is let into the first air flow passage 21. The pair of radiator plates 22 and 23 is made of a material having a good heat discharge characteristic so that heat generated inside the optical pickup may be effectively discharged.

Figure 3:
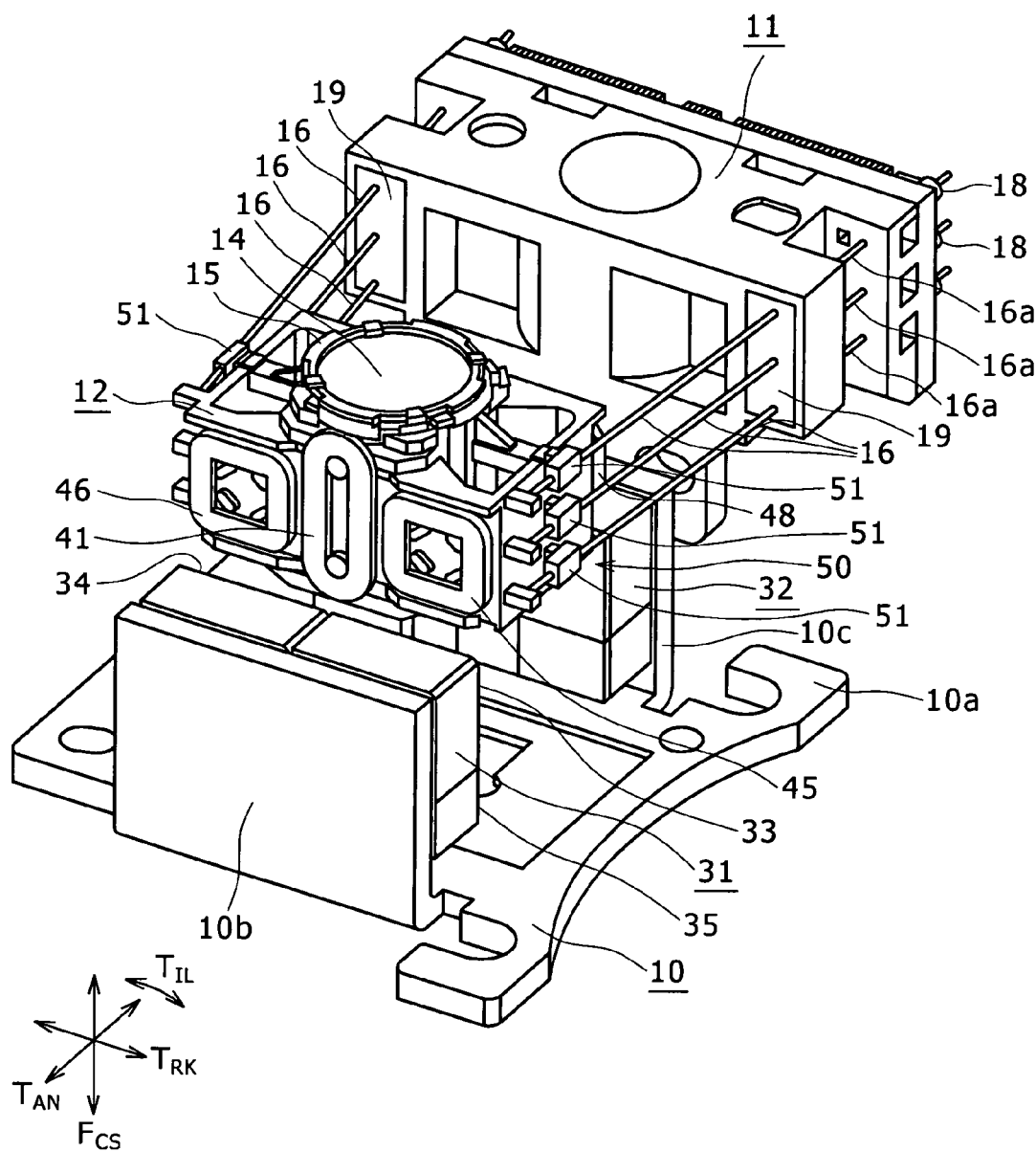
FIG. 3 is a perspective view of an objective lens driving device in an embodiment according to the present invention.

As shown in FIG. 3, the objective lens driving device 9 includes the following: a movable section 12 having a yoke base 10 and a lens holder 15 by which an objective lens 14 is held; plural elastic supporting members 16 supporting the movable section 12 not only movably in the focusing direction $F_{CS}$ and the tracking direction $T_{RK}$ of the objective lens 14, but also in a tiltable way in the tilting direction $T_{IL}$ within the plane parallel with the tangential direction $T_{AN}$ the optical disk 2, which is orthogonal to both of the focusing direction $F_{CS}$ and the tracking direction $T_{RK}$; and a fixed section 11 that is placed at a distance apart from the movable section 12 in the tangential direction $T_{AN}$ of the objective lens 14 and fastening the distal ends 16a of plural elastic supporting members 16.

The yoke base 10 is made of magnetic metal material, such as SPCC (cold-rolled steel plate) and silicon steel plate, and, as shown in FIG. 3, includes a base section 10a fixed on a movable base 8, and yoke sections 10b and 10c formed by being bent and rising up orthogonally from the base section 10a. The yoke sections 10b and 10c are disposed in an antero-posterior direction, namely, in the tangential direction $T_{AN}$ of the optical disk 2, with a space apart from each other.

The faces of the yokes 10b and 10c, facing each other, that is, both the sides facing the lens holder 15, are fitted with a first magnet 31 and a second magnet 32 respectively.

Figure 4:
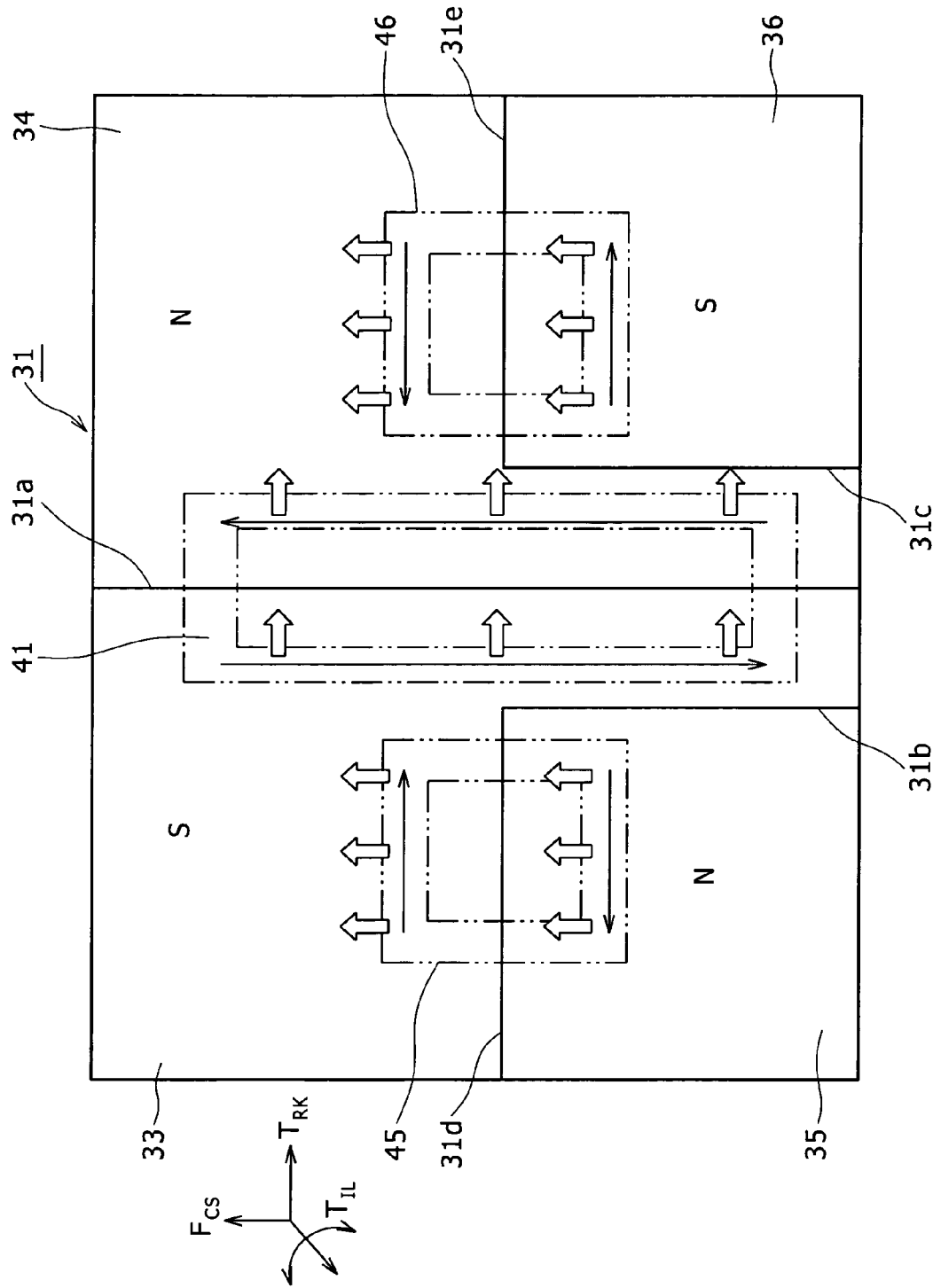
FIG. 4 is a plan view showing the relations of magnets, focusing coils, and tracking coils of an objective lens driving device in an embodiment according to the present invention.

As shown in FIGS. 3 and 4, the first magnet 31 is disposed to face the lens holder 15 in the tangential direction $T_{AN}$ and, at the border line 31a in the focusing direction $F_{CS}$, divided in the tracking direction $T_{RK}$ into two regions; then, the two divided regions are further divided respectively at the border lines 31b and 31c in the focusing direction $F_{CS}$ and also at the border lines 31d and 31e in the tracking direction $T_{RK}$. Thus, the first magnet 31 will have the first to fourth divided regions 33, 34, 35, and 36, each of which is magnetized in the tangential direction $T_{AN}$.

Of the first to fourth divided regions 33, 34, 35, and 36 on the side of the first magnet 31 facing the lens holder 15, the first and fourth divided regions 33 and 36 arranged in the upper left and lower right as viewed from the lens holder 15 are made to be S-pole, and the second and third divided regions 34 and 35 arranged in the upper right and lower left as viewed also from the lens holder 15 are made to be N-pole.

The second magnet 32 located facing the first magnet 31 in the tangential direction $T_{AN}$ has four regions divided in the same shapes as the first magnet 31; each region magnetized to have the reverse polar character in relation to the first magnet 31.

The fixed section 11 is fixed on the base and has a connection board provided with plural connection terminals 18 in both the right and left end areas on its back face. To these connection terminals 18, respective distal ends 16a of plural elastic supporting members 16 are fastened, for example, by means of soldering. The distal ends 16a of plural elastic supporting members 16 are arrayed 3 points each on both sides of the tracking direction $T_{RK}$, namely, 6 points in all, on the back face of the fixed section 11, at intervals of a certain space in the focusing direction $F_{CS}$. Also, in the fixed section 11, elastic parts 19 are provided to suppress the vibration of plural elastic supporting members 16.

Plural elastic supporting members 16 are connected to respective connecting wires of a power feeding board by way of each connecting terminal 18 on the back face of the fixed section 11. Each of the elastic supporting members 16 is made to jut out from the fixed section 11 in the tangential direction $T_{AN}$ toward the movable section 12.

Figure 5:
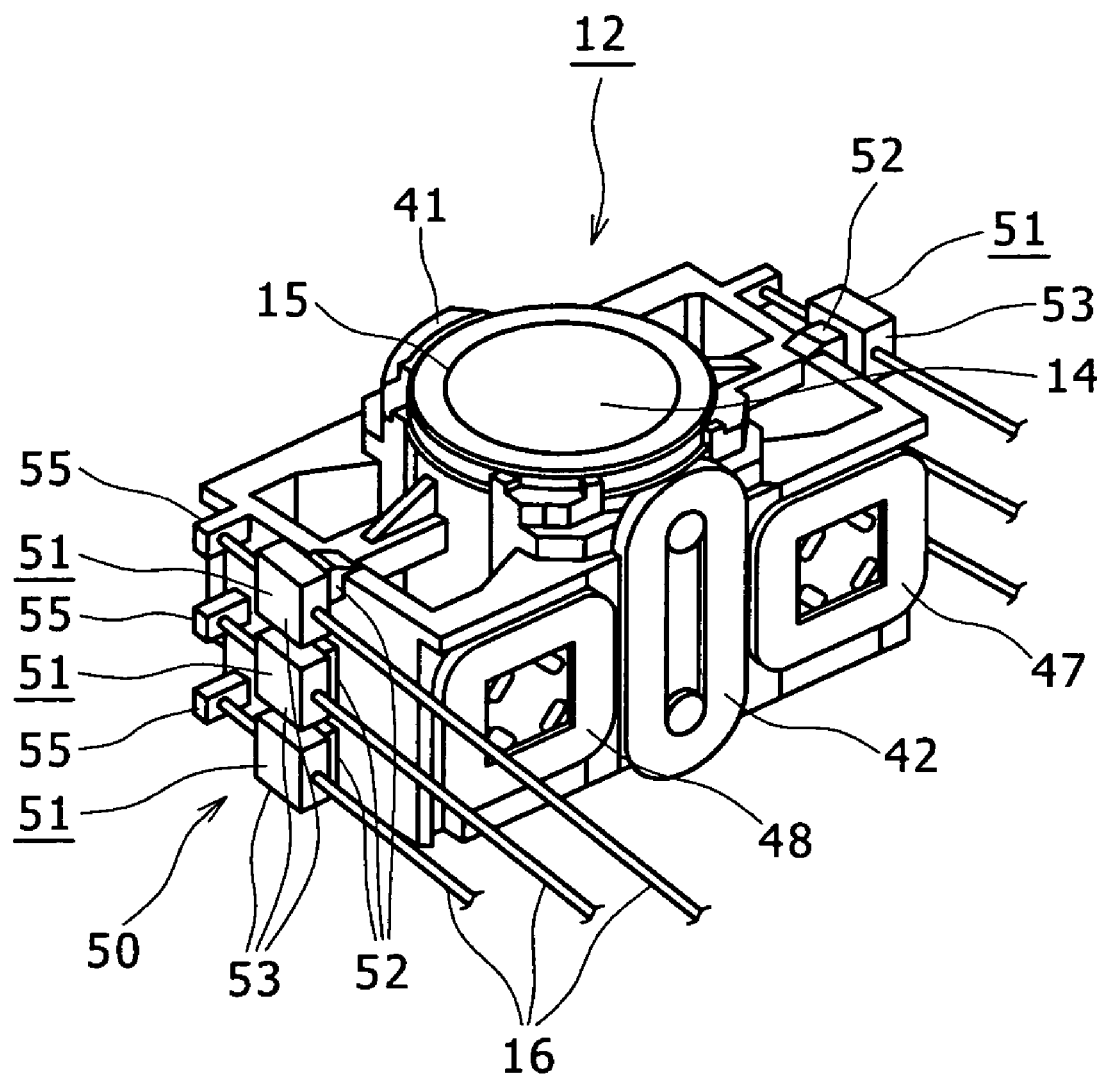
FIG. 5 is a perspective view of a movable section of an objective lens driving device in an embodiment according to the present invention.

The movable section 12 has the objective lens 14 and the lens holder 15 holding the objective lens 14. As shown in FIGS. 3 and 5, the lens holder 15 is provided with first and second tracking coils 41 and 42, which produce driving force in the tracking direction $T_{RK}$, or approximately in the radius direction of the optical disk 2, and first to fourth focusing coils 45, 46, 47, and 48, which produce driving force in the focusing direction $F_{CS}$, namely, the direction to get closer to or farther from the optical disk 2.

As indicated in FIG. 4, the first tracking coil 41 produces driving force in the tracking direction $T_{RK}$ by the functions of the magnetic field generated by the first and second divided regions 33 and 34 adjacent to the tracking direction $T_{RK}$ of the first magnet 31 and the electrical current running in the circumferential direction of the circumferential surface of the first tracking coil 41.

Likewise, the second tracking coil 42 also produces driving force in the tracking direction $T_{RK}$ by the functions of the magnetic field generated by the divided regions of the second magnet 32 and the electrical current running in the second tracking coil 42.

As shown in FIG. 4, the first and second focusing coils 45 and 46 produce driving force in the focusing direction $F_{CS}$ by coordinating the functions of the first and third divided regions 33 and 35 adjacent to the focusing direction $F_{CS}$ of the first magnet 31 and the second and fourth divided regions 34 and 36 adjacent to the focusing direction $F_{CS}$ of the first magnet 31.

In other words, the first focusing coil 45, which is arranged to take a place to face the divided regions 33 and 35 of the first magnet, produces driving force in the focusing direction $F_{CS}$ by coordinating the functions of the magnetic field, which is generated by the first and third divided regions 33 and 35 magnetized in the tangential direction $T_{AN}$ but in the counter direction, and the current running in the circumferential direction of the circumferential surface of the first focusing coil 45.

The second focusing coil 46, which is arranged to take a place to face the second and fourth divided regions 34 and 36, produces driving force in the focusing direction $F_{CS}$ by coordinating the functions of the magnetic field, which is generated by the second and fourth divided regions 34 and 36 in the tangential direction $T_{AN}$ but in the counter direction, and the current running in the circumferential direction of the circumferential surface of the second focusing coil 46.

Likewise, the third and fourth focusing coils 47 and 48 produce driving force in the focusing direction $F_{CS}$ by coordinating the functions of the magnetic field generated by the divided regions of the second magnet 32 and the current running in the third and fourth focusing coils 47 and 48.

The first and second focusing coils 45 and 46 and also the third and fourth focusing coils 47 and 48 are adjusted in the amount of current to be run, so as to vary the driving force in the focusing direction $F_{CS}$, and thereby generate driving force in the tilting direction $T_{IL}$.

The elastic supporting members 16 are fed with driving current for focusing and tracking adjustments as well as for a tilting adjustment from a power supply circuit through each connection terminal 18 on the connection board. Therefore, plural elastic supporting members 16 function also as feeding lines.

With regard to the objective lens driving device 9 configured as described above, when driving current is fed to the first and second tracking coils 41 and 42 and also the first to fourth focusing coils 45 to 48 from the power supply circuit by way of the connection board and the elastic supporting members 16, the movable section 12 is moved in the focusing direction $F_{CS}$, the tracking direction $T_{RK}$, or the tilting direction $T_{IL}$ depending on the relationship between the direction and strength of the driving current and the magnetic flux generated by the first and second magnets 31 and 32 and also the yoke sections 10b and 10c. Through the above triaxial adjustments in focusing, tracking, and tilting, this objective lens driving device 9 shows an improved tracking capability in point of getting the light beam spot to follow the recorded track. Furthermore, any movement of the movable section 12 in the focusing direction $F_{CS}$, the tracking direction $T_{RK}$, and the tilting direction $T_{LT}$ will be accompanied by elastic deformation of the elastic supporting members 16.

When the optical disk 2 is loaded in the optical disk device 1 configured as above, the disk rotary drive mechanism 4 operates to rotate the optical disk 2 around, and the optical pickup 7 is moved in the radius direction of the optical disk 2 up to a position corresponding to a desired recorded track, where an operation is made to record on or reproduce from the optical disk 2.

When driving current is supplied to the first and second tracking coils 41 and 42 in the course of a recording or reproducing operation, the movable section 12 of the objective lens driving device 9 is moved, as described above, in the tracking direction $T_{RK}$ shown in FIG. 3 in relation to the fixed section 11, and the light beam spot from the light source 20 is irradiated through the objective lens 14 and, by way of tracking adjustment, focused on a recorded track of the optical disk 2.

Also, when driving current is fed to the first to fourth focusing coils 45 to 48, the movable section 12 of the objective lens driving device 9 is moved, as described above, in the focusing direction $F_{CS}$ shown in FIG. 3 in relation to the fixed section 11, and the light beam spot from the light source 20 is irradiated through the objective lens 14 and, by way of focusing adjustment, led to focus on a recorded track of the optical disk 2.

Further, by changing the intensity of the driving current supplied to the first and fourth focusing coils 45 and 48 and also the second and third focusing coils 46 and 47, the movable section 12 of the objective lens driving device 9 is moved, as described above, in the direction of $T_{IL}$ shown in FIG. 3 in relation to the fixed section 11. The light beam spot from the light source 20 is irradiated through the objective lens 14 and, by way of tilting adjustment, led to focus on the optical disk 2 nearly perpendicularly so as to be able to cope with a deformed surface.

The lens holder 15 of the movable section 12 is molded of synthetic resin material. On the side of the lens holder 15, plural retaining sections 51 for retaining plural elastic supporting members 16 and also plural feeder retainers 55 for electricity feeding, all of these parts being formed together in one piece are provided. The foregoing explanation assumes that the elastic supporting members 16 are formed together with the movable section 12, but they may as well be made each a in different piece and of a different material.

Figure 6A:
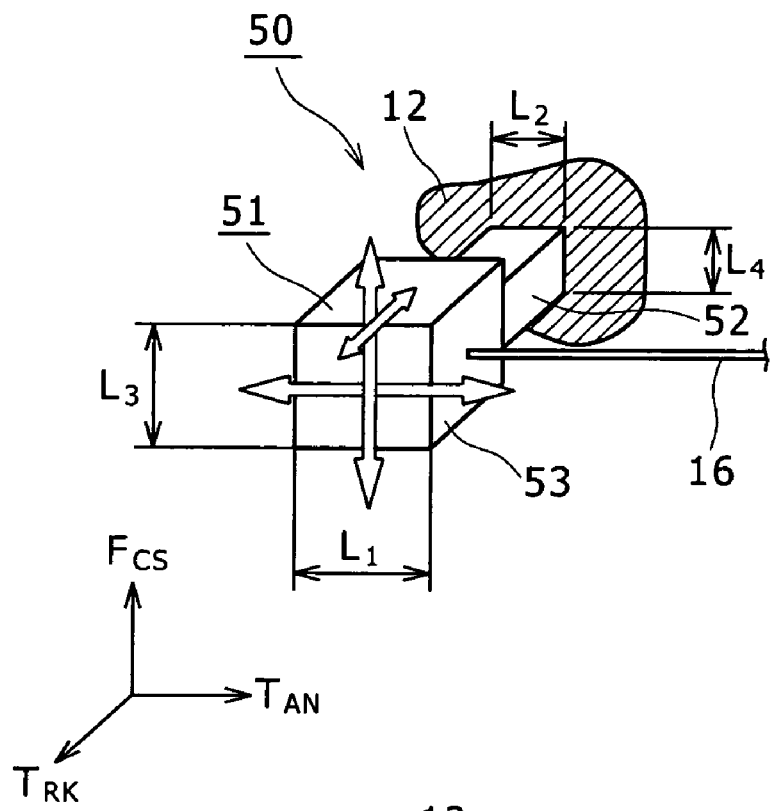
FIG. 6A is a perspective view of a retaining section serving as a dynamic vibration absorber for an objective lens driving device in an embodiment according to the present invention.

A dynamic vibration absorber 50 is provided at each retaining section by which plural elastic supporting members 16 are connected to the movable section 12. This dynamic vibration absorber 50 is a vibration system which has the same character frequency as a physical object, the vibration of which has to be controlled, and which serves, by being fitted on that physical object, to reduce vibration of the physical object availing itself of resonance. In an embodiment according to the present invention, the dynamic vibration absorber 50, as shown in FIG. 5 and FIG. 6A, is configured by forming an elastic displacement section 52, which virtually is the base part of the retaining section 51 but made smaller in thickness, and also by forming a fixing section 53 to serve as a weighting section in the apical portion of the retaining section 51. This fixing section 53 is provided in a plural number so as to correspond to each of the plural elastic supporting members and is used to connect the elastic supporting member 16 to the movable section 12. Also, the fixing section 53, as the weighting section, has its size in the vibratory direction made larger in comparison with the elastic displacement section 52.

More specifically, the sizes of the fixing section 53, namely, the size $L_1$ in the tangential direction $T_{AN}$ and the size $L_3$ in the focusing direction $F_{CS}$, are determined to be larger than the sizes of the elastic displacement section 52 formed at the base part on the side of the movable section 12, namely, the size $L_2$ in the tangential direction $T_{AN}$ and the size $L_4$ in the focusing direction $F_{CS}$, as indicated by the following formulas (1) and (2).

$$L_1 > L_2 \quad (1)$$

$$L_3 > L_4 \quad (2)$$

As seen above, the fixing section 53 has its cross-sectional area in the tracking direction $T_{RK}$ made larger than the elastic displacement section 52, and, further, it is possible that the fixing section 53 has its unit weight of the cross section in the tracking direction $T_{RK}$ made larger than the elastic displacement section 52.

The dynamic vibration absorber 50 or the retaining section 51 respectively has the elastic displacement section 52 provided at the base part and the fixing section 53 so formed as to have a heavier weight on the outer side of the elastic displacement section 52. Thus, the character frequency of the retaining section 51 functions as a damper against vibration when such vibration is caused to the movable section 12, making it possible to reduce a resonance peak which otherwise may worsen the servo characteristic and to suppress unwanted vibration effectively. In other words, the retaining section 51 has its own spring constant and weight determined according to shape, specific gravity of a material, and rigidity. Therefore, the retaining section 51 vibrates in a cycle different from the vibration of the movable section 12 and can function as a damper against vibration of the movable section 12, thus suppressing unwanted vibration effectively.

As mentioned above, the dynamic vibration absorber 50 of the objective lens driving device 9 has an apical portion in the retaining section 51 formed in the tracking direction orthogonal to the focusing direction, that is, the principal direction of vibration. By increasing the unit weight of this apical portion, the dynamic vibration absorber 50 can function as a damper against vibration and suppress vibration of the movable section 12.

Figure 6B:
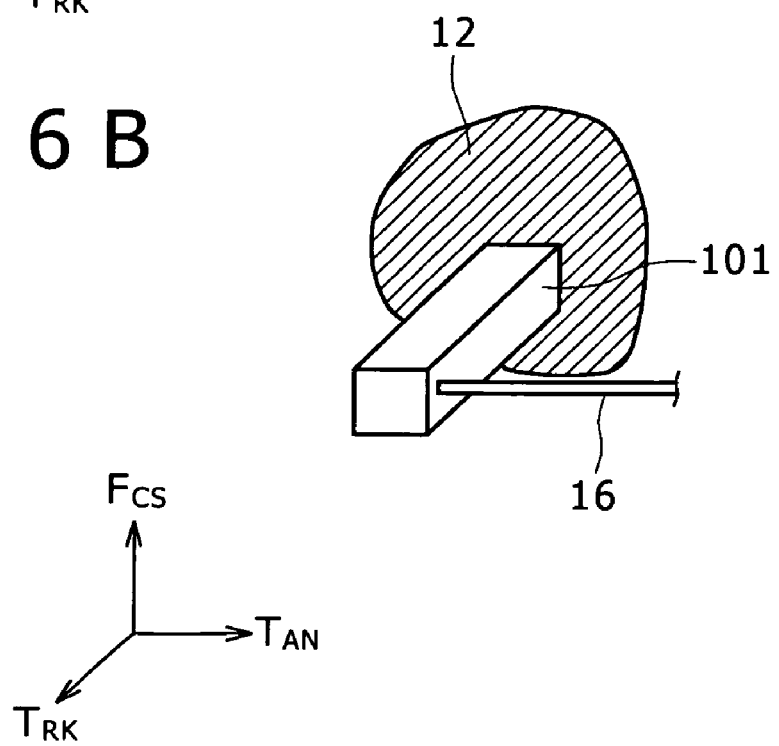
FIG. 6B is a perspective view of another retaining section as a comparative example for comparison with the retaining section in FIG. 6A.
Figure 7:
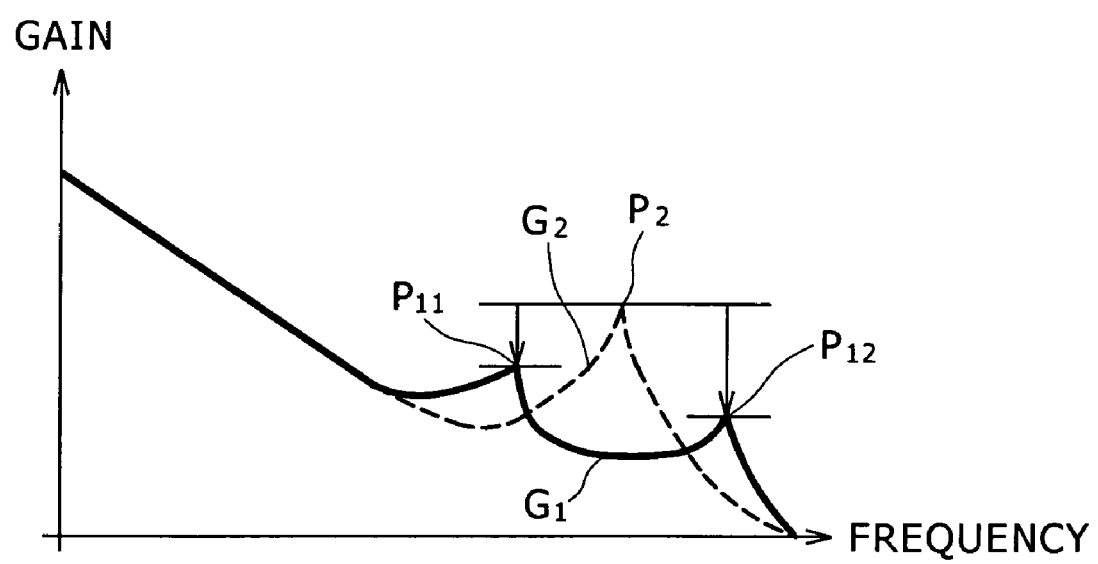
FIG. 7 is a graph showing a frequency characteristic of the transfer function from thrust in the focusing direction given to a movable section to a focus error signal in relation to an objective lens driving device in an embodiment according to the present invention and a comparative example of an objective lens driving device.

In relation to the objective lens driving device 9 in an embodiment according to the present invention, using FIG. 6 and FIG. 7, explanation is given here concerning the dynamic vibration absorber 50 of the lens driving device 9 which is capable of reducing the resonance peak of the movable section 12. Additionally, FIG. 6B is used to explain a comparative example of a retaining member 101 to be compared with the retaining section 51, that is, the dynamic vibration absorber 50 in an embodiment according to the present invention.

A retaining member 101 as a comparative example is formed on the side of the movable section 12, with its cross section in the tracking direction $T_{RK}$ being of almost even rectangular shape, and in its apical portion, it holds and fixes the elastic supporting member 16 to the movable section 12.

In regard to the objective lens driving device having the retaining section 51 or 101 as shown in FIG. 6A or FIG. 6B, a frequency characteristic of transfer function from thrust in the focusing direction $F_{CS}$ given to the movable section 12 to a focus error signal is shown in FIG. 7. The explanation here covers the transfer function in the focusing direction only, but a similar effect is obtainable with regard to transfer functions in the tracking and tilting directions. In FIG. 7, the horizontal axis indicates frequency, the vertical axis indicates gain; the curve $G_1$ represents a frequency characteristic in the case where the retaining section 51 is used as the dynamic vibration absorber 50 of the objective lens driving device 9 in an embodiment according to the present invention, and the curve $G_2$ represents the frequency characteristic in the case where the retaining section 101 as a comparative example is used.

The frequency characteristic $G_2$ of the objective lens driving device using the retaining section 101, as shown in FIG. 7, is observed to have a resonance peak $P_2$ attributable to the elastic vibration of the movable section 12. This resonance peak is likely to deteriorate the characteristic of a focusing servo and disturb the performance of recording and/or reproducing data on or from the optical disk.

As compared to the above, the frequency characteristic $G_1$ of the objective lens driving device 9 using the retaining section 51 as the dynamic vibration absorber 50 shows that the resonance peak attributable to the elastic vibration of the movable section has appeared in two places of P11 and P12 with lowered peak gains, as a result of the dynamic vibration absorber functioning as a damper. Because the peak gains are lowered, the resonance peaks in this case do not deteriorate the characteristic of a focusing servo and can prevent disturbing data recording and/or reproducing performance in relation to the optical disk.

In the above way, the dynamic vibration absorber 50 with its own character frequency functions as a damper against vibration of the movable section 12, leading to a lowering of the resonance peak, which otherwise might deteriorate the servo characteristic, and suppression of unwanted vibration of the movable section 12.

In the above explanation, the retaining section 51, which serves at once as the dynamic vibration absorber 50 is, configured so that the size on the apical portion side in the tangential direction $T_{AN}$ and the focusing direction $F_{CS}$ of the fixing section 53 may become larger than the size on the base end side in the tangential direction $T_{AN}$ and the focusing direction $F_{CS}$ of the elastic displacement section 52. The embodiment of the present invention, however, is not limited to the foregoing; in fact, it is enough if at least either of the two sizes of the fixing section 53 is configured to be larger than the corresponding size of the elastic displacement section 52. In other words, it will do if the cross section including the direction of vibration, namely, the cross section in the tracking direction $T_{RK}$ for the present case, is formed to be large in cross-sectional area and also in unit weight. For another example, it will do as well if the size on the apical portion side in the focusing direction $F_{CS}$ of the fixing section is made larger than the size on the base end side in the focusing direction $F_{CS}$ of the elastic displacement section.

In a further example, the retaining section 51 constituting the dynamic vibration absorber 50 can be made of another material so as to make the apical portion heavier in unit weight than the base end portion, instead of changing the cross-sectional area in the tracking direction $T_{RK}$.

The objective lens driving device 9 in an embodiment according to the present invention is provided with the dynamic vibration absorber 50 at the retaining section by which the elastic supporting members 16 supporting the movable section 12 is connected to the movable section 12 holding the objective lens 14; and this dynamic vibration absorber 50 with its own character frequency functions as a damper against the vibration of the movable section 12, leading to a lowering of the resonance peak, which otherwise might deteriorate the servo characteristic, and effective suppression of unwanted vibration of the movable section 12. Consequently, the objective lens driving device 9 in an embodiment according to the present invention makes it possible to suppress the generation of elastic vibration and to handle the positioning operation with a high accuracy.

Also, by being provided with the above-mentioned objective lens driving device 9 and the dynamic vibration absorber 50, the latter functioning as a damper and effectively suppressing unwanted vibration of the movable section 12, the optical pickup 7 in an embodiment according to the present invention enables the realization of good recording and reproduction in relation to optical disks.

Further, by being provided with the above-mentioned objective lens driving device 9 and the dynamic vibration absorber 50, the latter functioning as a damper and effectively suppressing unwanted vibration of the movable section 12, the recording and reproducing device or the optical disk device 1 in an embodiment according to the present invention enables the realization of good recording and reproduction in relation to optical disks.

Additionally, in the above description of the objective lens driving device 9, the movable section 12 holding the objective lens 14 is explained so as to be operated through triaxial adjustments in the focusing direction $F_{CS}$, the tracking direction $T_{RK}$, and the tilting direction $T_{IL}$, but the operational manner for the objective lens driving device, the optical pickup, and the recording and reproducing device or the optical disk device is not limited to what has been described hereinbefore; it may be configured so that the movable section may be supported to allow movement in the focusing direction $F_{CS}$ and in the tracking direction $T_{RK}$.

It should be understood by those skilled in the art that various modifications, combinations, sub-combinations, and alterations may occur depending on design requirements and other factors insofar as they are within the scope of the appended claims or the equivalents thereof.

What is claimed is:

1. An objective lens driving device comprising:
    a movable section holding an objective lens,
    a plurality of elastic supporting members supporting the movable section movably in a focusing direction and a tracking direction of the objective lens,
    a fixed section to which a distal end side of the plurality of the elastic supporting members are fastened, and
    a dynamic vibration absorber projecting from the movable section in a cantilevered manner and having an elastic displacement section and a weighting section being larger than the elastic displacement section with the elastic displacement section connected to and disposed between the movable section and the weighting section and the plurality of elastic supporting members being connected to the weighting section at a proximal end side of the plurality of elastic supporting members.

2. An objective lens driving device according to claim 1, wherein each one of the elastic displacement section and the weighting section has a box-shaped configuration.

3. An objective lens driving device according to claim 2, wherein the elastic displacement section extends in an elastic displacement section length, an elastic displacement section width and an elastic displacement section height and the weighting section extends in a weighting section length, a weighting section width and a weighting section height and
    wherein the elastic displacement section width is less than the weighting section width and the elastic displacement section height is less than the weighting section height.

4. An optical pickup comprising:
    a movable carriage that moves in a radius direction of an optical disk driven to rotate by a disk rotary drive mechanism, and
    an objective lens driving device arranged on the movable carriage,
    wherein
    the objective lens driving device includes:
        a movable section holding an objective lens,
        a plurality of elastic supporting members supporting the movable section movably in focusing and tracking directions of the objective lens,
        a fixed section to which distal ends of the plurality of elastic supporting members are fastened, and
        a dynamic vibration projecting from the movable section in a cantilevered manner and having an elastic displacement section and a weighting section being larger than the elastic displacement section with the elastic displacement section connected to and disposed between the movable section and the weighting section and the plurality of elastic supporting members being connected to the weighting section at a proximal end side of the plurality of elastic supporting members.

5. An optical pickup according to claim 4, wherein each one of the elastic displacement section and the weighting section has a box-shaped configuration.

6. An optical pickup according to claim 5,
    wherein the elastic displacement section extends in an elastic displacement section length, an elastic displacement section width and an elastic displacement section height and the weighting section extends in a weighting section length, a weighting section width and a weighting section height and
    wherein the elastic displacement section width is less than the weighting section width and the elastic displacement section height is less than the weighting section height.

7. An optical disk device comprising:
    a disk rotary drive mechanism by which an optical disk is driven to rotate, and
    an optical pickup which, through an objective lens, irradiates a light beam to the optical disk driven to rotate by the disk rotary drive mechanism,
    wherein
    the optical pickup includes:
        a movable carriage which is moved in a radius direction of the optical disk, and an objective lens driving device arranged on the movable carriage,
    wherein
    the objective lens driving device includes:
        a movable section holding the objective lens,
        a plurality of elastic supporting members by which the movable section is supported movably in focusing and tracking directions of the objective lens,
        a fixed section to which a distal end side of the plurality of elastic supporting members are fastened, and
        a dynamic vibration absorber projecting from the movable section in a cantilevered manner and having an elastic displacement section and a weighting section being larger than the elastic displacement section with the elastic displacement section connected to and disposed between the movable section and the weighting section and the plurality of elastic supporting members being connected to the weighting section at a proximal end side of the plurality of elastic supporting members.

8. An optical pickup according to claim 7, wherein each one of the elastic displacement section and the weighting section has a box-shaped configuration.

9. An optical pickup according to claim 8,
    wherein the elastic displacement section extends in an elastic displacement section length, an elastic displacement section width and an elastic displacement section height and the weighting section extends in a weighting section length, a weighting section width and a weighting section height and
    wherein the elastic displacement section width is less than the weighting section width and the elastic displacement section height is less than the weighting section height.

* * * * *